United States Patent [19]
Teramachi

[11] Patent Number: 4,880,317
[45] Date of Patent: * Nov. 14, 1989

[54] ANGULAR CONTACT LINEAR SLIDE BEARING

[76] Inventor: Hiroshi Teramachi, 2-34-8, Higashi-Tamagawa, Setagaya-Ku, Tokyo, Japan

[*] Notice: The portion of the term of this patent subsequent to May 23, 2006 has been disclaimed.

[21] Appl. No.: 170,276

[22] Filed: Mar. 18, 1988

[30] Foreign Application Priority Data

Mar. 20, 1987 [JP] Japan .................................. 62-63666
Mar. 20, 1987 [JP] Japan .................................. 62-63667

[51] Int. Cl.⁴ .............................................. F16C 29/06
[52] U.S. Cl. ......................................... 384/45; 384/43
[58] Field of Search ............................. 384/43, 44, 45; 464/168

[56] References Cited

U.S. PATENT DOCUMENTS

| | | | |
|---|---|---|---|
| 3,008,774 | 11/1961 | Morris et al. | 384/45 |
| 3,398,999 | 8/1968 | Halvorsen | 384/45 |
| 4,127,309 | 11/1978 | Teramachi | 384/45 |
| 4,502,737 | 3/1985 | Osawa | 384/45 |
| 4,582,369 | 4/1986 | Itoh | 384/45 X |
| 4,662,763 | 5/1987 | Itoh | 384/43 X |

FOREIGN PATENT DOCUMENTS

| | | | |
|---|---|---|---|
| 0136451 | 9/1979 | Japan | 384/43 |
| 0196428 | 10/1985 | Japan | 384/43 |

Primary Examiner—Thomas R. Hannon
Attorney, Agent, or Firm—Kenyon & Kenyon

[57] ABSTRACT

A bearing apparatus has a bearing block including balls; two adjacent ball rolling surfaces with the load lines through the balls diverging from or converging toward each other, and unloaded ball passages opposing the ball rolling surfaces; end caps mounted to the opposite ends of the bearing block for forming two endless tracks by providing communication between the ball rolling surfaces and the unloaded ball passages; and a track rail having two ball rolling grooves along which loaded balls roll. The bearing block further includes a separation portion or member and two loaded ball grooves separated by the separation portion or member and having openings which are positioned so that the load lines diverge from or converge toward each other. The width of each of the openings is smaller than the diameter of each of the balls, and the ball rolling surfaces are formed in the loaded ball grooves.

10 Claims, 13 Drawing Sheets

ANGULAR CONTACT LINEAR SLIDE BEARING

BACKGROUND OF THE INVENTION

1. Field of the Invention

The present invention relates to angular contact linear slide bearings of the type which is suitable for use in linearly guiding movable elements in slide portions of industrial robots or machine tools such as numerical control machines.

2. Description of the Prior Art

As is well known, such an angular contact linear slide bearing comprises a bearing block including a pair of ball rolling surfaces formed adjacent to each other and unloaded ball passages each formed in opposing relationship with a corresponding one of the ball rolling surfaces, end caps mounted to the respective ones of the opposite end surfaces of the bearing block for providing communication between the opposite ends of each of the ball rolling surfaces and the opposite ends of the corresponding one of the unloaded ball passages to thereby form a pair of endless tracks, a multiplicity of balls which roll along each of the endless tracks, and a track rail having a pair of ball rolling grooves along which the balls roll in a loaded state while they are rolling on the ball rolling surfaces of the bearing block. In use, one angular contact linear slide bearing is mounted to, for example, each of opposite sides of a table, and these two bearings are made to support in combination four-directional loads of radial loads, reverse-radial loads, rightward loads and leftward loads.

In such an angular contact linear slide bearing, a ball retainer including a pair of slots each having a slightly smaller width than the diameter of each ball is mounted on the portion defined between the end caps in such a manner that each of the slots is positioned parallel to the corresponding one of the ball rolling surfaces of the bearing block. In this arrangement, the balls are prevented from coming off while they are rolling on the ball rolling surfaces of the bearing block, and it is possible to improve the working efficiency when bearings are to be incorporated into a table or the like.

The above-described angular contact linear slide bearing can be used to constitute a linear guide mechanism which is compact in size and stable owing to its low center of gravity. In addition, the angular contact linear slide bearing possesses various other advantages; for example, clearance adjustment is easy, rigidity can be built up by increasing preload, and light sliding motion can be achieved by reducing preload.

However, in the above-described conventional type of angular contact linear slide bearing, the ball retainer is commonly formed by pressing a metal sheet having a small sheet thickness, and also, the slots are formed substantially over the entire length of the ball retainer. The ball retainer is only secured at its opposite ends to a pair of end caps. For this reason, the ball retainer is particularly susceptible to twisting, and is easily deformed owing to a lack of the strength and rigidity of the ball retainer itself. As a result, the ball retainer is liable to curve or the width of each slot may change, and therefore it is difficult to precisely work the ball retainer. Even if the ball retainer can be precisely worked, the dimensions thereof are easily changed due to deformation, and, during use, the deformed ball retainer may contact with rolling balls, so that noise is generated or smooth sliding motion is hindered. In addition, the ball retainer and the end caps must be manually mounted to the bearing block since these four components need to be accurately positioned with respect to one another. This leads to the problem that the automation of bearing assembly is difficult.

SUMMARY OF THE INVENTION

It is therefore an object of the present invention to provide an angular contact linear slide bearing in which it is possible to prevent balls from coming off each ball rolling surface without the need to use a ball retainer as described above even when the bearing block is separated from the track rail.

To achieve the above and other objects, there is provided, in accordance with one aspect of the present invention, an angular contact linear slide bearing characterized by:

a bearing block including a pair of ball rolling surfaces formed adjacent to each other and positioned such that respective load lines through the ball rolling surfaces diverge from each other, and unloaded ball passages each formed in opposing relationship with the corresponding one of the ball rolling surfaces;

end caps mounted to the respective ones of the opposite end surfaces of the bearing block for providing communication between the opposite ends of each of the ball rolling surfaces and the opposite ends of the corresponding one of the unloaded ball passages to thereby form a pair of endless tracks;

a multiplicity of balls which roll along each of the endless tracks; and a track rail having a pair of ball rolling grooves along which the balls roll in a loaded state while they are rolling on the ball rolling surfaces of the bearing block;

the aforesaid bearing block further including:

a separation portion; and a pair of loaded ball grooves separated by the separation portion and provided with openings which are positioned such that the load lines diverge from each other, each of the openings having an opening width smaller than at least the diameter of each of the balls, the aforesaid ball rolling surfaces formed in the loaded ball grooves.

In this aspect of the present invention, the loaded ball grooves may be integrally formed in one side surface of the bearing block by cutting and grinding. Otherwise, a pair of grooved ways each having a substantially semicircular cross section is formed in such a manner that they are adjacent to each other in one side surface of the bearing block, and the loaded ball grooves may be constituted by the pair of grooved ways; and a ball retainer mounted to the separation portion between the grooved ways by welding, preferably, by projection welding, the ball retainer having a pair of retaining portions each of which is formed in such a manner as to extend around the inner circumference of each of the grooved ways.

In accordance with another aspect of the present invention, there is provided an angular contact linear slide bearing characterized by:

a bearing block including a pair of ball rolling surfaces formed adjacent to each other and positioned such that respective load lines through the ball rolling surfaces converge toward each other, and unloaded ball passages each formed in opposing relationship with the corresponding one of the ball rolling surfaces;

end caps mounted to the respective ones of the opposite end surfaces of the bearing block for providing communication between the opposite ends of each of the ball rolling surfaces and the opposite ends of the corresponding one of the unloaded ball passages to thereby form a pair of endless tracks;

a multiplicity of balls which roll along each of the endless tracks; and a track rail having a pair of ball rolling grooves along which the balls roll in a loaded state while they are rolling on the ball rolling surfaces of the bearing block;

the aforesaid bearing block further including a pair of loaded ball grooves formed adjacent to each other and provided with openings which are positioned such that the load lines converge toward each other, each of the openings having an opening width smaller than at least the diameter of each of the balls, the aforesaid ball rolling surfaces formed in the loaded ball grooves.

In this aspect of the present invention, methods for forming the aforesaid unloaded ball grooves can be selected from ones which will be illustratively described below. For example, the unloaded ball grooves may be formed by cutting and grinding one side surface of the bearing block. Alternatively, the loaded ball grooves may be constituted by a combination of a pair of mutually opposing ball retainers and a separation portion formed between the ball retainers. Otherwise, the loaded ball grooves may be constituted by a combination of a flat groove having large width and a separation member which is mounted in the flat groove at a position thereof that corresponds to its longitudinal axis, or by a combination of a pair of mutually opposing ball retainers and a separation member which is mounted at the middle position between the ball retainers in such a manner as to extend parallel to the longitudinal axis of the bearing block.

In accordance with the aforesaid first and second aspects of the present invention, each of the loaded ball grooves formed in the bearing block has the ball rolling surface in its interior, and has an opening whose width is smaller than the diameter of each ball. Even if the bearing block is separated from the track rail, the balls do not come off the loaded ball grooves. It is therefore unnecessary to use a ball retainer of the type that has a slot slightly narrower than the diameter of each ball and that is mounted to the portion between opposing end caps. Therefore, the angular contact linear slide bearing of the present invention can be formed and assembled with high precision, and automation of bearing assembly is enabled.

Further objects, features and advantages of the present invention will become apparent from the following description of preferred embodiments of the present invention, taken with reference to the accompanying drawings.

DESCRIPTION OF THE PREFERRED EMBODIMENTS

Figure 1:
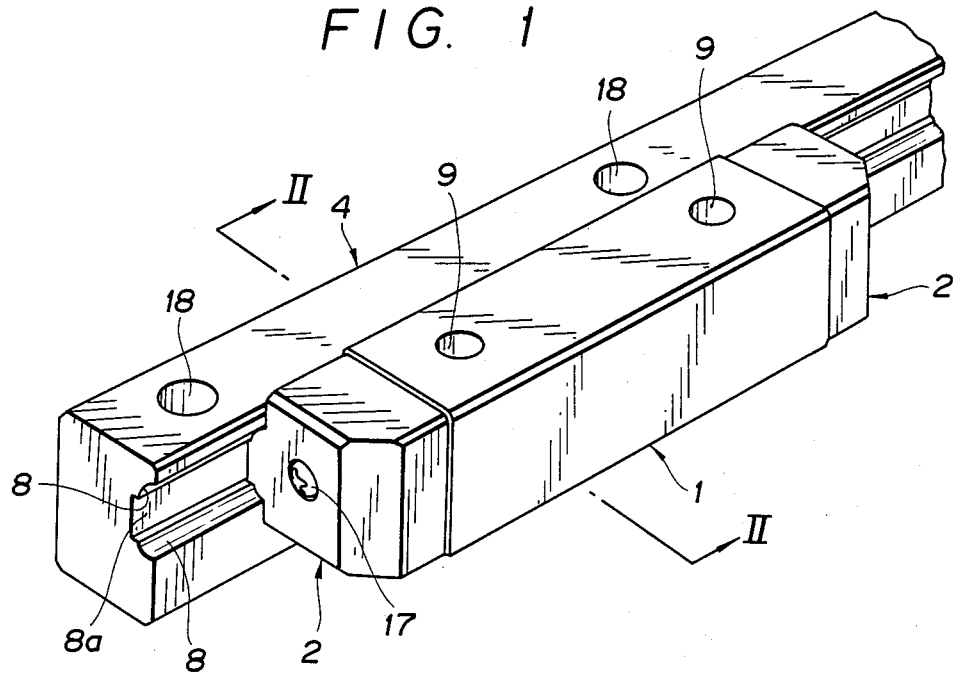
FIG. 1 is a diagrammatic perspective view of a first embodiment of an angular contact linear slide bearing in accordance with the present invention.
Figure 2:
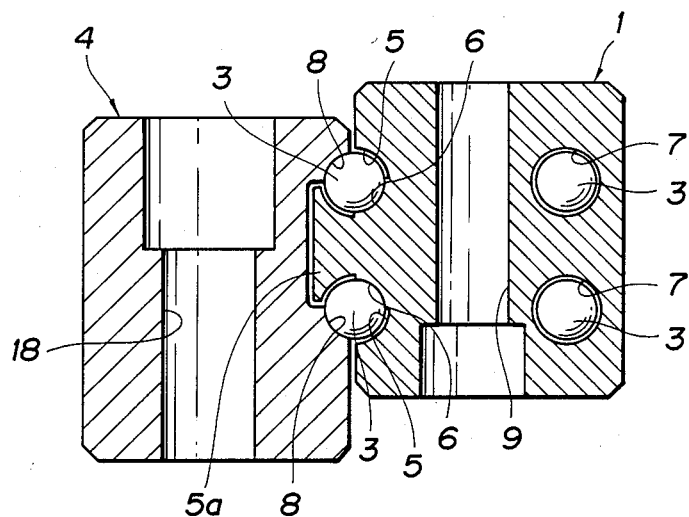
FIG. 2 is a cross sectional view taken along the line II—II of FIG. 1.
Figure 3:
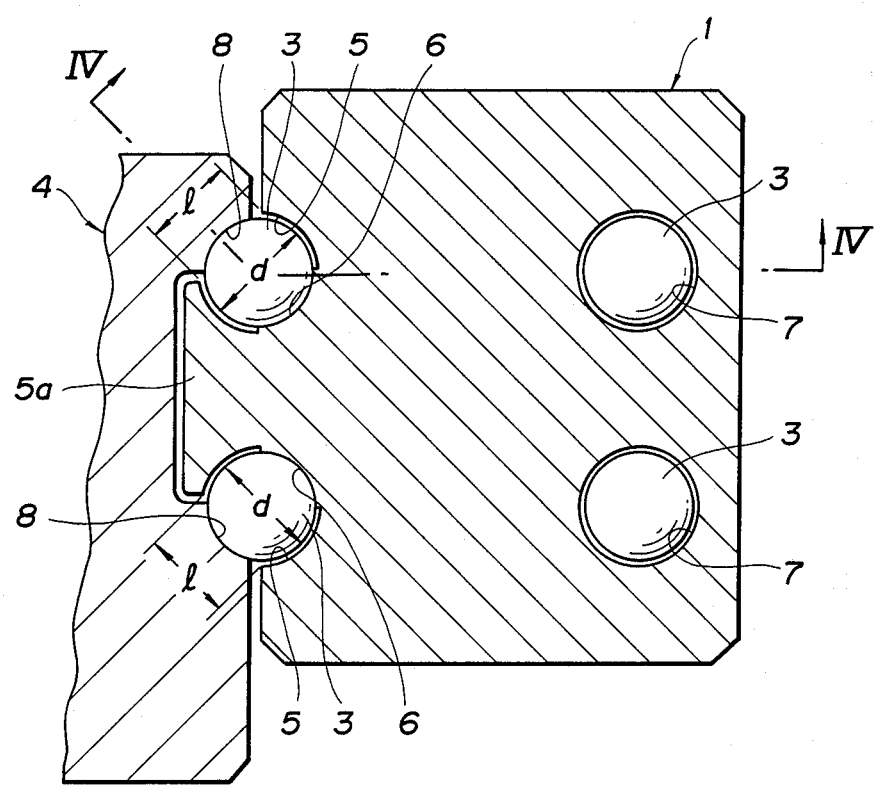
FIG. 3 is a cross sectional view illustrating on an enlarged scale the essential portion of the embodiment shown in FIG. 2.
Figure 4:
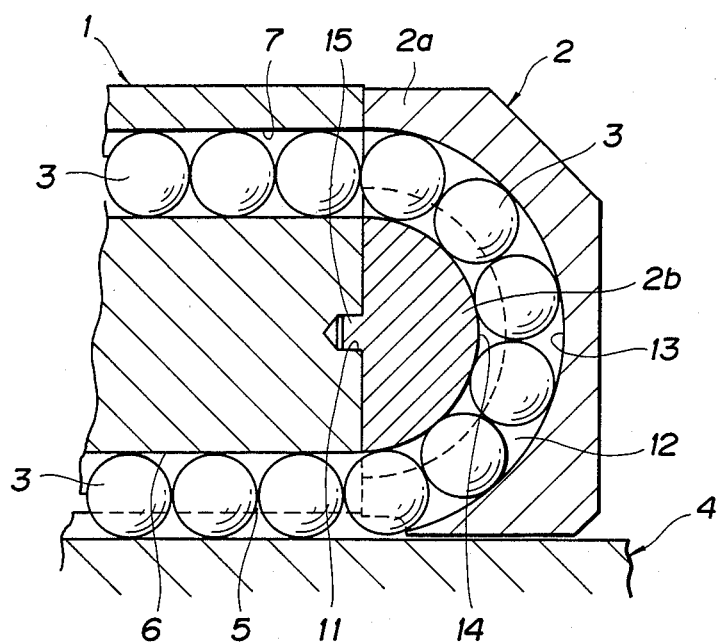
FIG. 4 is a cross sectional view taken along the line IV—IV of FIG. 2.
Figure 5:
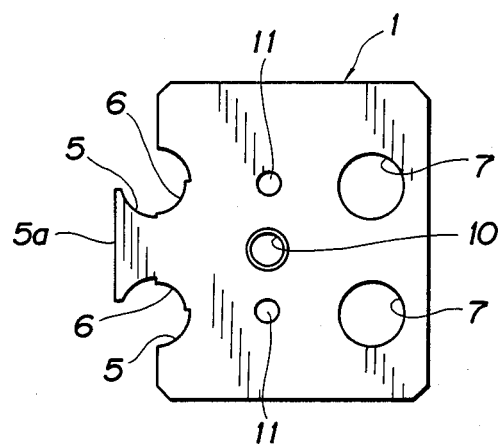
FIG. 5 is a front elevational view of a bearing block used in the first embodiment.

Preferred embodiments of the angular contact linear slide bearing in accordance with the present invention will be described below with reference to the accompanying drawings.

FIGS. 1 through 4 illustrate an angular contact linear slide bearing according to a first preferred embodiment of the present invention.

The linear slide bearing according to the first preferred embodiment is essentially constituted by a bearing block 1 including: a pair of loaded ball grooves 5 separated by a separation wall 5a and having openings which are positioned such that the load lines through the respective loaded ball grooves 5 diverge from each other, each opening having an opening width l smaller than at least a diameter d of each ball, a pair of ball rolling surfaces 6 formed in the loaded ball grooves 5 in opposing relationship with the corresponding openings, and unloaded ball rolling bores (unloaded ball passages) 7 formed in opposing relationship with the corresponding ball rolling surfaces 6; a pair of end caps 2 mounted on the opposite end surfaces of the bearing block 1 for providing communication between the opposite ends of each of the ball rolling surfaces 6 and the opposite ends of the corresponding one of the unloaded ball rolling bores 7 so as to form a pair of endless tracks; a multiplicity of balls 3 which roll along each of the endless tracks; and a track rail 4 having a pair of ball rolling grooves 8 along which the balls 3 roll in a loaded state while they are rolling on the ball rolling surfaces 6 in the bearing block 1.

In this embodiment, the loaded ball grooves 5 of the above-described bearing block 1 may be directly formed by cutting and, if required, grinding.

Figure 6:
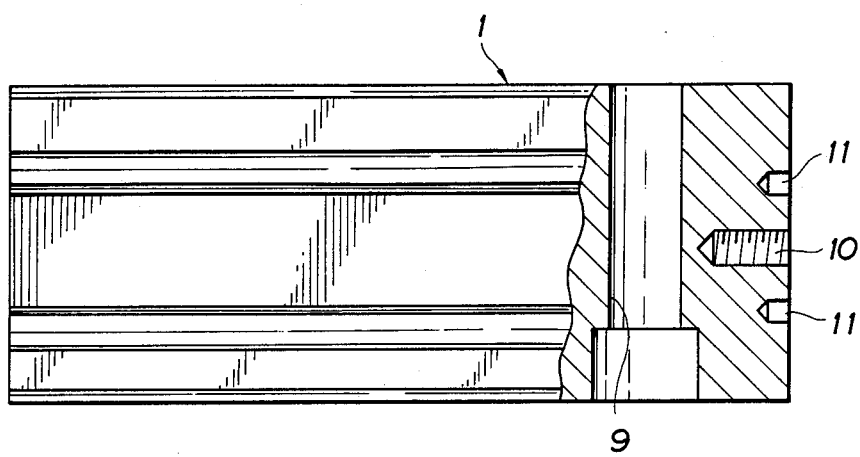
FIG. 6 is a side elevation, partially in cross section, of the bearing block shown in FIG. 5.
Figure 7:
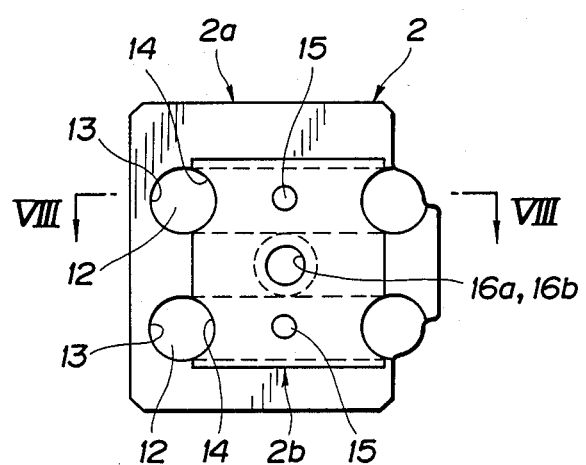
FIG. 7 is a rear elevational view illustrating an end cap used in the first embodiment.
Figure 8:
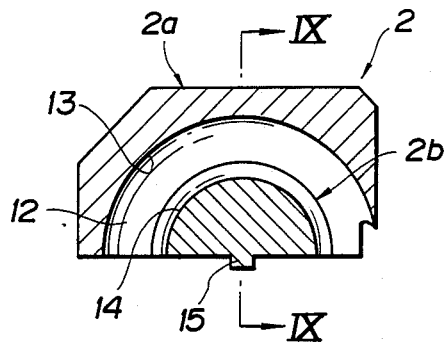
FIG. 8 is a cross sectional view taken along the line VIII—VIII of FIG. 7.
Figure 9:
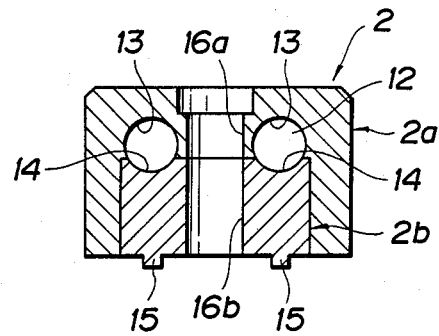
FIG. 9 is a cross sectional view taken along the line IX—IX of FIG. 8.
Figure 10:
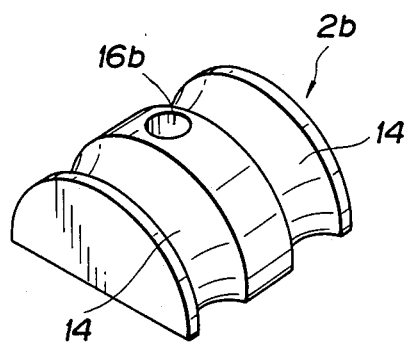
FIG. 10 is a perspective view of a rounded piece used in the first embodiment.
Figure 11:
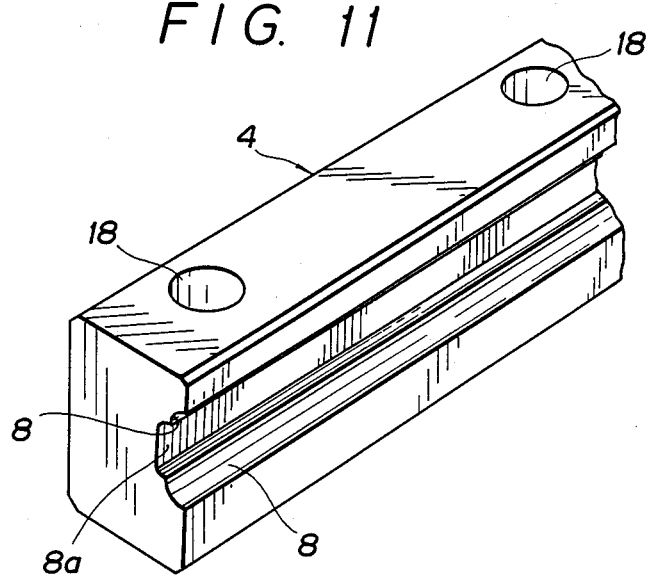
FIG. 11 is a fragmentary perspective view of a track rail used in the first embodiment.

As shown in FIGS. 1 and 6, mounting bores 9 extend through the bearing block 1 in the vertical direction, and a mounting bolt is inserted into each of the mounting bores 9 when the present bearing is to be incorporated into another device such as a table. A mounting threaded hole 10 used for mounting the end caps 2 to the bearing block 1 and a pair of engagement holes 11 used for positioning the mounted end caps 2 are formed in each of the opposite end surfaces of the bearing block 1.

As shown in FIGS. 1, 4, and 7 through 10, each of the end caps 2 has ball recirculating paths 12 which form the endless tracks by providing communication between the opposite ends of the loaded ball grooves 5 formed in the bearing block 1 and the opposite ends of the corresponding unloaded ball rolling bores 7. The end caps 2 are each constituted by a cap body 2a having two grooved ways 13 which are semicircularly formed in its inner surface; and a rounded piece 2b having a substantially half disk-like cross section and an outer periphery provided with circumferential grooves 14 which are combined with the corresponding grooved ways 13 to form the ball recirculating paths 12 which are semicircularly curved, the rounded piece 2b being fitted into a corresponding inner space of the cap body 2a so that each of the circumferential grooves 14 is positioned substantially concentrically with respect to the grooved ways 13.

The end caps 2 are mounted in the following manner. The rounded piece 2b is fitted into the inner space of the cap body 2a so that each of the circumferential grooves 14 is positioned substantially concentrically with respect to the grooved ways 13, and a pair of projections 15 formed on each of the rounded pieces 2b are fitted into the engagement holes 11 formed in the opposite end surfaces of the bearing block 1, and thus the end caps 2 are positioned. Then, each fastening bolt 17 is inserted into through holes 16a and 16b which are formed in the respective substantial centers of the cap body 2a and the rounded piece 2b. Subsequently, the fastening bolts 17 are respectively screwed into the corresponding mounting threaded holes 10 formed in the opposite end of the bearing block 1 until the bolts 17 are tightly fastened.

As shown in FIGS. 1 to 3 and 11, a flat groove 8a having an extended width is formed in the track rail 4 on one side thereof, and the ball rolling grooves 8 are formed along the respective opposite sides of the flat groove 8a at positions which correspond to the ball rolling surfaces 6. Through holes 18 adapted to receive a bolt for fixing the track rail 4 to a machine such as a bed are formed in the track rail 4 in such a manner as to be spaced apart from each other by a predetermined distance. Accordingly, the bearing block 1 and the track rail 4 are combined with each other so that the separation wall 5a, which separates the loaded ball grooves 5 of the bearing block 1, can be fitted into the flat groove 8a of the track rail 4 with a predetermined clearance being maintained therebetween.

Figure 12:
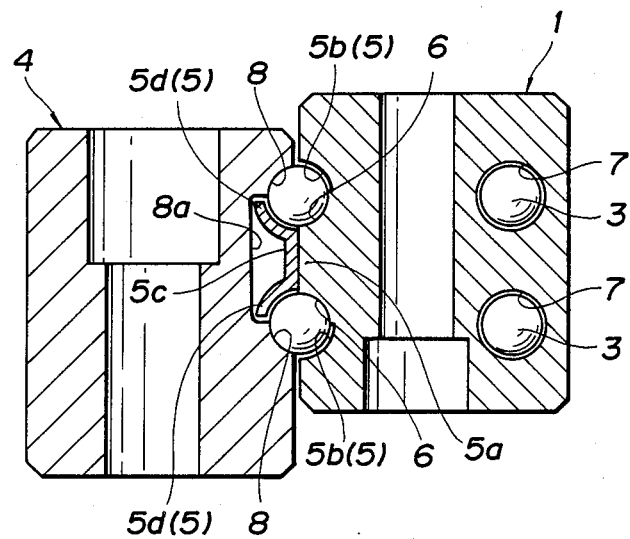
FIG. 12 is a diagrammatic cross sectional view of a second embodiment of the angular contact linear slide bearing in accordance with the present invention.
Figure 13:
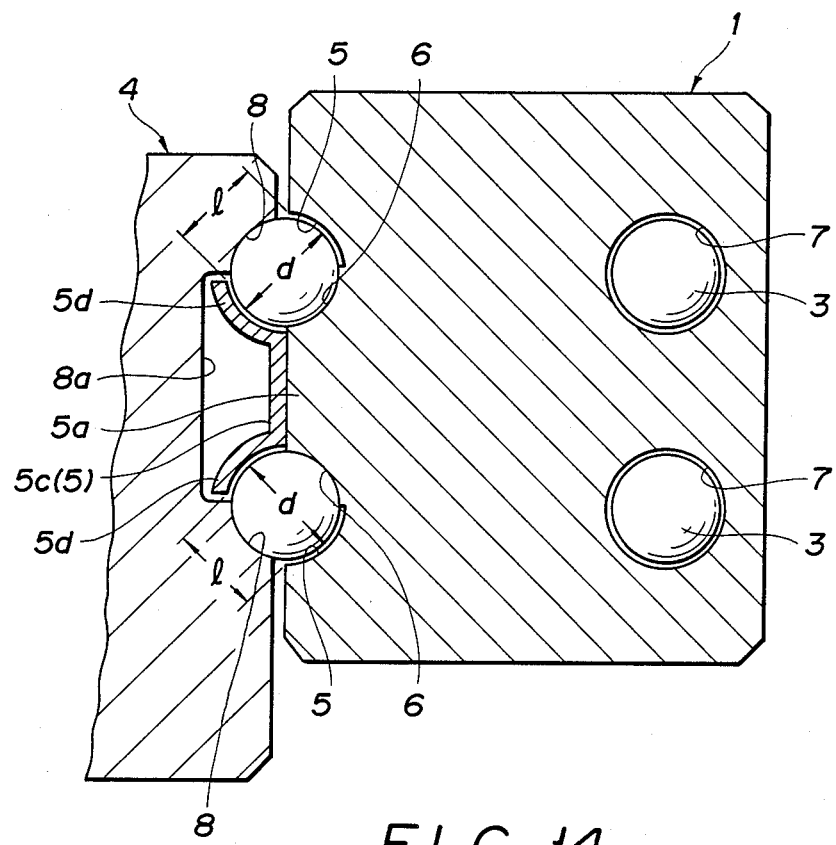
FIG. 13 is a cross sectional view illustrating on an enlarged scale the essential portion of the embodiment shown in FIG. 12.
Figure 14:
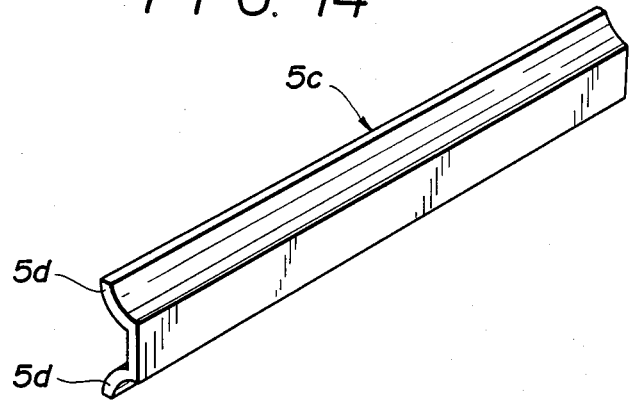
FIG. 14 is a perspective view of the ball retainer shown in FIG. 13.

FIGS. 12 through 14 show a second embodiment of the angular contact linear slide bearing. Unlike the above-described embodiment, the pair of loaded ball grooves 5 formed in the bearing block 1 is constituted by a combination of grooved ways 5b formed adjacent to each other and each having a substantially semicircular cross section and a ball retainer 5c which is mounted by projection welding on the separation portion 5a defined between the grooved ways 5b, the ball retainer 5c having a pair of retaining portions 5d each of which projects in an arc around the inner circumference of each of the grooved ways 5b. With this second embodiment of the angular contact linear slide bearing, grinding using a grinding stone or heat treatment such as annealing can be easily and accurately effected upon the ball rolling surface 6 formed in each of the loaded ball grooves 5 before the ball retainer 5c is welded to the separation portion 5a defined between the grooved ways 5b.

The following is a description, referring to FIGS. 15 through 22, of a third preferred embodiment of the angular contact linear slide bearing of the present invention.

FIGS. 15 through 18 illustrate an angular contact linear slide bearing according to the third embodiment of the present invention.

The linear slide bearing according to the third embodiment is essentially constituted by a bearing block 101 including: a pair of loaded ball grooves 105 separated by a separation portion 105a and having openings which are positioned such that the load lines through the respective loaded ball grooves 105 converge toward each other, each opening having an opening width ( smaller than at least a diameter d of each ball, a pair of ball rolling surfaces 106 formed in the loaded ball grooves 105 in opposing relationship to the corresponding openings, and unloaded ball rolling bores (unloaded ball passages) 107 formed in opposing relationship with the corresponding ball rolling surfaces 106; a pair of end caps 102 mounted on the opposite end surfaces of the bearing block 101 for providing communication between the opposite ends of each of the ball rolling surfaces 106 and the opposite ends of the corresponding one of the unloaded ball rolling bores 107 so as to form a pair of endless tacks; a multiplicity of balls 103 which roll along each of the endless tracks; and a track rail 104 having a pair of ball rolling grooves 108 along which the balls 103 roll in a loaded state while they are rolling on the ball rolling surfaces 106 in the bearing block 101.

Figure 15:
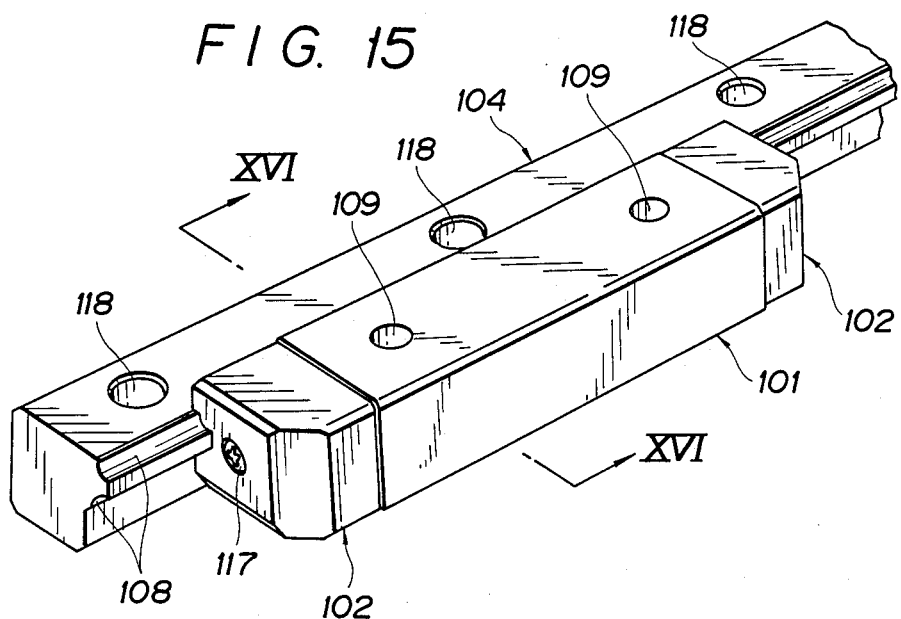
FIG. 15 is a diagrammatic perspective view of a third preferred embodiment of the angular contact linear slide bearing in accordance with the present invention.
Figure 16:
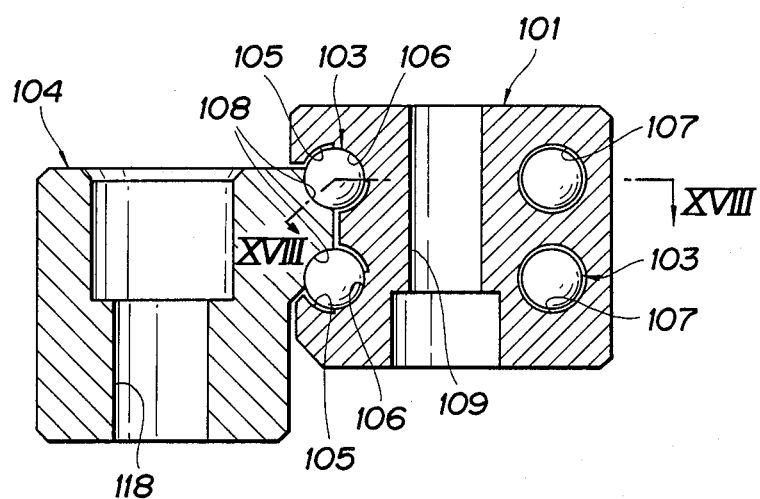
FIG. 16 is a cross sectional view taken along the line XVI—XVI of FIG., 15.

In the third embodiment, the loaded ball grooves 105 of the above-described bearing block 101 may be directly formed by cutting and, if required, grinding. As shown in FIG. 15 and 16, mounting bores 109 extend through the bearing block 101 in the vertical direction, and a mounting bolt is inserted into each of the mounting bores 109 when the present bearing is to be incorporated into another device such as a table. A mounting threaded hole 110 (FIG. 19) used for mounting the end caps 102 to the bearing block 101 and a pair of engagement holes 111 (FIG. 19) used for positioning the mounted end caps 102 are formed in each of the opposite end surfaces of the bearing block 101.

Figure 18:
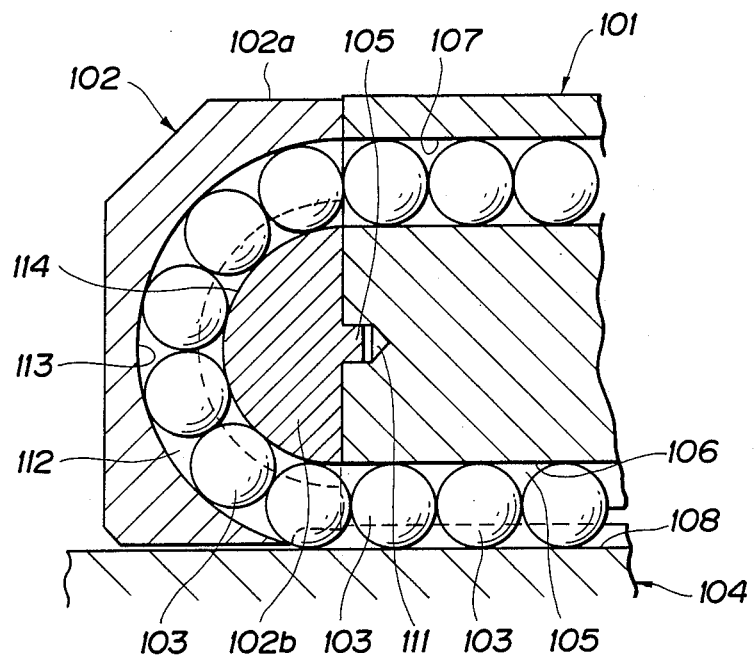
FIG. 18 is a cross sectional view taken along the line XVIII—XVIII of FIG. 16.
Figure 19:
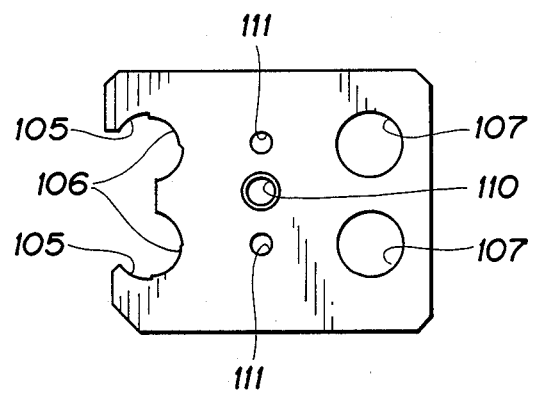
FIG. 19 is a front elevational view of the bearing block used in the third embodiment.
Figure 20:
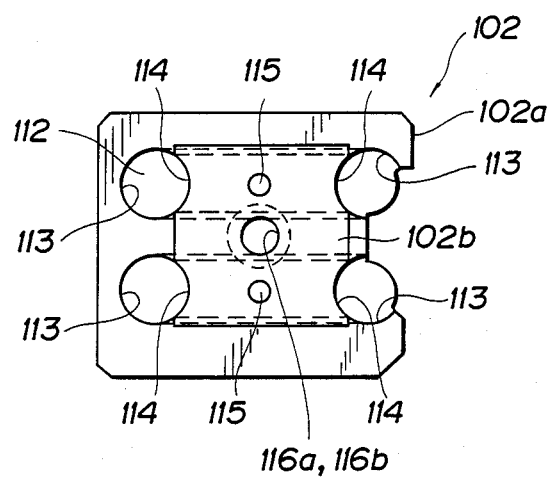
FIG. 20 is a rear elevational view illustrating an end cap used in the third embodiment.

As shown in FIGS. 15, 18, and 20, each of the end caps 102 has ball recirculating paths 112 which form the endless tracks by providing communication between the opposite ends of the loaded ball grooves 105 formed in the bearing block 101 and the opposite ends of the corresponding unloaded ball rolling bores 107. The end caps 102 are each constituted by a cap body 102a having two grooved ways 113 which are semicircularly formed in its inner surface; and a rounded piece 112b having a substantially half disk-like cross section and an outer periphery provided with circumferential grooves 114 which are combined with the corresponding grooved ways 113 to form the ball recirculating paths 112 which are semicircularly curved, the rounded piece 102b being fitted into a corresponding inner space of the cap body 102a so that each of the circumferential grooves 114 is positioned substantially concentrically with respect to the grooved ways 113. The end caps 102 are mounted in the following manner. The rounded piece 102b is fitted into the inner space of the cap body 102a so that each of the circumferential grooves 114 is positioned substantially concentrically with respect to the grooved ways 113, and a pair of projections 115 formed on each of the rounded pieces 102b are fitted into the engagement holes 111 formed in the opposite end surfaces of the bearing block 101, and thus the end caps 102 are positioned. Then, each fastening bolt 117 is inserted into through holes 116a and 116b which are formed in the respective substantial centers of the cap body 102a and the rounded piece 102b. Subsequently, the fastening bolts 117 are screwed into the corresponding mounting threaded holes 110 formed in the opposite end of the bearing block 101 until the bolts 117 are tightly fastened.

Figure 17:
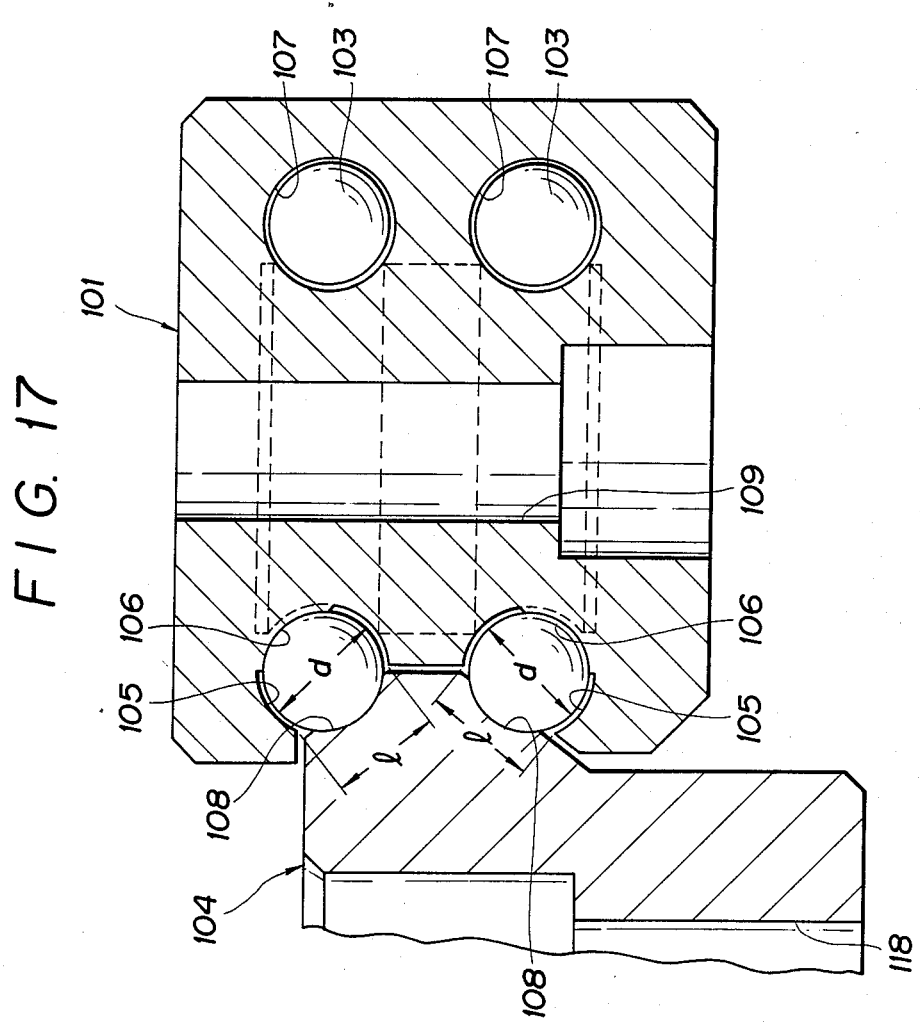
FIG. 17 is a cross sectional view illustrating on an enlarged scale the essential portion of the embodiment shown in FIG. 16.

As shown in FIGS. 15 to 17, the ball rolling grooves 108 are formed along one shoulder of the track rail 103 at positions which correspond to the bal rolling surfaces 106. Through holes 118 adapted to receive a bolt for fixing the track rail 104 to a machine such as a bed are formed in the track rail 104 at positions which are spaced apart from each other by a predetermined distance.

Figure 21:
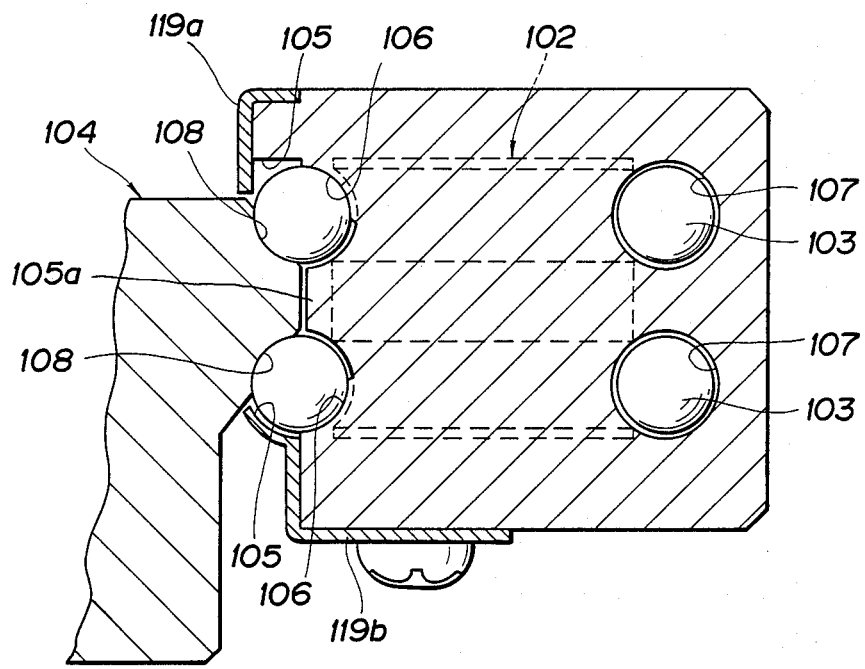
FIG. 21 is a diagrammatic cross sectional view similar to FIG. 17, but illustrates a modified form of the third embodiment.
Figure 22:
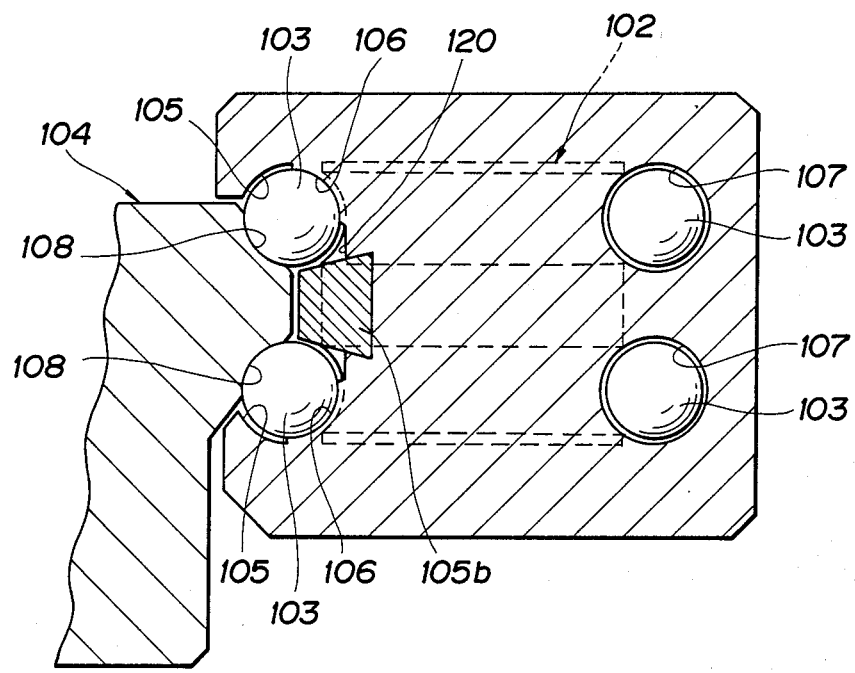
FIG. 22 is a diagrammatic cross sectional view similar to FIG. 17, but illustrates another modified form of the third embodiment.
Figure 23:
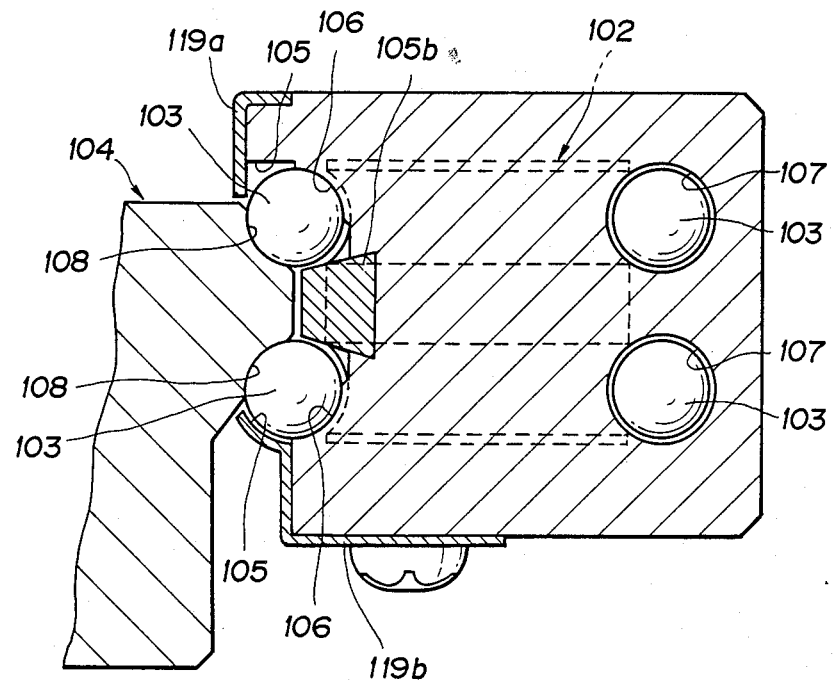
FIG. 23 is a diagrammatic cross sectional view similar to FIG. 17, but illustrates still another modified form of the third embodiment.

FIGS. 21 to 23 show modified forms of the loaded ball grooves 105 formed in the bearing block 101.

Referring to FIG. 21, semicircular grooves each having a substantially semicircular cross section are formed adjacent to each other in one side of the bearing block 101, and a separation portion 105a is defined between the semicircular grooves. A pair of ball retainers 119a and 119b is mounted on the side of the bearing block 101 that has the semicircular grooves by welding such as projection welding or by suitable fixing means such as machine screws. The loaded ball grooves 105 are constituted by a combination of the ball retainers 119a and 119b and the separation portion 105a which separates the semicircular grooves.

Referring to FIG. 22, the loaded ball grooves 105 are constituted by a combination of a flat groove 120 and a separation member 105b which is fixed to the flat groove 120 at a position that corresponds to its longitudinal axis.

Referring to FIG. 23, the pair of ball retainers 119a and 119b is disposed in opposing relationship with each other, and the loaded ball grooves 105 are constituted by a combination of the ball retainers 119a and 119b and the separation member 105b which is mounted at the middle position between the ball retainers 119a and 119b in such a manner as to extend parallel to the longitudinal axis of the bearing block 1.

In any of the modified forms, since the opening of each groove can be formed with a large opening width, grinding using a grinding stone or heat treatment such as annealing can be easily and accurately effected upon the ball rolling surface 106 formed in each of the loaded ball grooves 105 before the ball retainer 119a and 119b is welded to the separation portion 105a between the grooved ways 105b.

It will be appreciated from the foregoing that, in accordance with the present invention, balls are prevented from coming off while rolling on each ball rolling surface without the need to provide a ball retainer between two end caps. Therefore, it is possible to solve the problem that the ball retainer is mounted with an error increased by a combination of a tolerance produced when the end caps are mounted to a bearing block and a tolerance produced when the ball retainer is mounted to the portion between the end caps, so that smooth sliding motion can be achieved. Furthermore, it is possible to reduce noise to a level as low as possible and, since bearing assembly is facilitated, it is possible to automate bearing assembly.

What is claimed is:

1. An angular contact linear slide bearing comprising:
   a bearing block including a pair of ball rolling surfaces formed adjacent to each other and positioned such that respective load lanes through said ball rolling surfaces diverge from each other, and unloaded ball passages each formed in opposing relationship with the corresponding one of said ball rolling surfaces;
   end caps mounted to respective ones of the opposite end surfaces of said bearing block for providing communication between the opposite ends of each of said ball rolling surfaces and the opposite ends of the corresponding one of said unloaded ball passages to thereby form a pair of endless tracks;
   a multiplicity of balls which roll along each of said endless tracks; and
   a track rail having a pair of ball rolling grooves along which said balls roll in a loaded state while they are rolling on said ball rolling surfaces of said bearing block;
   said bearing block further including:
   a separation portion; and
   a pair of leaded ball grooves separated by said separation portion and provided with openings which are positioned such that said load lines diverge from each other, said ball rolling surfaces form in said loaded ball grooves, with each ball rolling surface having a first longitudinal side and a second longitudinal side, an up load ball groove formed in each loaded ball groove adjacent said first longitudinal side of the respective ball rolling surface, and a down load ball groove formed in each loaded ball groove adjacent said second longitudinal side of the respective ball rolling surface, each up and down load ball groove being recessed with respect to the respective ball rolling surface, the up and down load ball grooves of each loaded ball groove defining said opening of the respective loaded ball groove, with said opening having an opening width smaller than at least the diameter of each of said balls.

2. An angular contact linear slide bearing according to claim 1, wherein said pair of loaded ball grooves is integrally formed in said bearing block by cutting and grinding.

3. An angular contact linear slide bearing according to claim 1, wherein said pair of loaded ball grooves is constituted by a combination of a pair of grooves ways formed adjacent to each other and each having a substantially semicircular cross section and a ball retainer mounted on said separation portion between said grooved ways by projection welding, said ball retainer having a pair of retaining portions each of which projects in an arc around the inner circumference of each of said grooved ways.

4. An angular contact linear slide bearing according to claim 1, wherein said pair of loaded ball grooves is integrally formed in said bearing block.

5. An angular contact linear slide bearing comprising:
   a bearing block including a pair of ball rolling surfaces formed adjacent to each other and positioned such that respective load lines through said ball rolling surfaces converge toward each other, and unloaded ball passages each formed in opposing relationship with the corresponding one of said ball rolling surfaces;
   end caps mounted to respective ones of the opposite end surfaces of said bearing block for providing communication between the opposite ends of each of said ball rolling surfaces and the opposite ends of the corresponding one of said unloaded ball passages to thereby form a pair of endless tracks;
   a multiplicity of balls which roll along each of said endless tracks; and
   a track rail having a pair of ball rolling grooves along which said balls roll in a loaded state while they are rolling on said ball rolling surfaces of said bearing block;
   said bearing block further including a pair of loaded ball grooves formed adjacent to each other and provided with openings which are positioned such that said load lines converge toward each other, said ball rolling surfaces formed in said loaded ball grooves, with each ball rolling surface having a first longitudinal side and a second longitudinal side, an up load ball groove formed in each loaded ball groove adjacent said first longitudinal side of the respective ball rolling surface, and a down ball groove formed in each loaded ball groove adjacent said second longitudinal side of the respective ball rolling surface, the up and down load ball grooves of each loaded ball groove defining said opening of the respective loaded ball groove, with said opening having an opening width smaller than at least the diameter of each of said balls.

6. An angular contact linear slide bearing according to claim 5, wherein said pair of loaded ball grooves that are adjacent to each other is constituted by a combination of a pair of mutually opposing ball retainers and a separation portion formed between said ball retainers.

7. An angular contact linear slide bearing according to claim 5, wherein said pair of loaded ball grooves that are adjacent to each other is constituted by a combination of a flat groove having large width and a separation member which is mounted in aid fault groove at a position thereof that corresponds to its longitudinal axis.

8. An angular contact linear slide bearing according to claim 5, wherein said pair of loaded ball grooves that are adjacent to each other is constituted by a combination of a pair of mutually opposing ball retainers and a separation member which is mounted at the middle position between said ball retainers in such a manner as to extend parallel to the longitudinal axis of said bearing block.

9. An angular contact linear slide bearing according to claim 5, wherein said pair of loaded ball grooves is integrally formed in said bearing block.

10. An angular contact linear slide bearing according to claim 5, wherein said pair of loaded ball grooves is integrally formed in said bearing block by cutting and grinding.

* * * * *

UNITED STATES PATENT AND TRADEMARK OFFICE
CERTIFICATE OF CORRECTION

PATENT NO. : 4,880,317
DATED : November 14, 1989
INVENTOR(S) : H. Teramachi

It is certified that error appears in the above-identified patent and that said Letters Patent is hereby corrected as shown below:

Column 8, line 41, claim 1, line 23, change "leaded" to -- loaded --.

Column 8, line 44, claim 1, line 26, change "form" to -- formed --.

Column 10, line 2, claim 5, after "down" insert -- load --.

Column 10, line 19, claim 7, line 5, change "aid" to -- said --.

Column 10, line 19, claim 7, line 5, change "fault" to -- flat --.

Signed and Sealed this

First Day of October, 1991

Attest:

HARRY F. MANBECK, JR.

*Attesting Officer*     *Commissioner of Patents and Trademarks*